(12) United States Patent
Huet et al.

(10) Patent No.: US 9,767,413 B2
(45) Date of Patent: Sep. 19, 2017

(54) METHOD AND COMPUTER PROGRAM FOR THE MAINTENANCE AID OF AIRCRAFT EQUIPMENT

(71) Applicants: AIRBUS OPERATIONS (S.A.S.), Toulouse (FR); AIRBUS (S.A.S.), Blagnac (FR)

(72) Inventors: Jean-Max Huet, Launaguet (FR); Stéphane Besseau, Toulouse (FR); Bruno Maillard, Tournefeuille (FR); François Michaud, Toulouse (FR)

(73) Assignees: Airbus Operations (S.A.S.), Toulouse (FR); Airbus (S.A.S.), Blagnac (FR)

( * ) Notice: Subject to any disclaimer, the term of this patent is extended or adjusted under 35 U.S.C. 154(b) by 435 days.

(21) Appl. No.: 14/341,272

(22) Filed: Jul. 25, 2014

(65) Prior Publication Data

US 2015/0039551 A1 Feb. 5, 2015

(30) Foreign Application Priority Data

Jul. 31, 2013 (FR) ...................................... 13 57572

(51) Int. Cl.
*G06N 7/00* (2006.01)
*G05B 23/02* (2006.01)

(52) U.S. Cl.
CPC ........... *G06N 7/00* (2013.01); *G05B 23/0283* (2013.01); *G05B 2219/45071* (2013.01)

(58) Field of Classification Search
CPC .................. G06N 7/00; G05B 23/0283; G05B 2219/45071
See application file for complete search history.

(56) References Cited

U.S. PATENT DOCUMENTS

| 5,161,158 A | 11/1992 | Chakravarty |
| 5,522,026 A | 5/1996 | Records |
| 6,003,808 A | 12/1999 | Nguyen |
| 6,122,575 A | 9/2000 | Schmidt |

(Continued)

FOREIGN PATENT DOCUMENTS

| FR | 2 938 676 A1 | 5/2010 | |
| FR | 2938676 A1 * | 5/2010 | ......... G05B 23/0229 |

OTHER PUBLICATIONS

Restriction Requirement for U.S. Appl. No. 14/491,622 dated Jan. 6, 2016.

(Continued)

*Primary Examiner* — Stanley K Hill
*Assistant Examiner* — Tsu-Chang Lee
(74) *Attorney, Agent, or Firm* — Jenkins, Wilson, Taylor & Hunt, P.A.

(57) ABSTRACT

According to a first aspect, the subject matter disclosed herein relates to a decision aid method for maintenance operations of aircraft equipment, the aircraft including a maintenance system arranged to make a record of equipment failure messages and of equipment failure warning messages emitted during a flight, the method comprising extracting at least one combination of failure messages corresponding to failure messages recorded by the maintenance system during a flight and a set of previous flights; determining, as a function of the at least one extracted combination, a probability of occurrence of at least one warning message possibly accompanied by one or more failure messages.

5 Claims, 1 Drawing Sheet

(56) References Cited

U.S. PATENT DOCUMENTS

| | | |
|---|---|---|
| 6,292,723 B1 | 9/2001 | Brogan |
| 6,636,771 B1 | 10/2003 | Varma |
| 7,149,612 B2 | 12/2006 | Stefani |
| 8,069,167 B2 * | 11/2011 | Gao .................. G06F 17/30864 707/706 |
| 8,112,368 B2 * | 2/2012 | Eklund ................. G06F 11/008 382/159 |
| 8,140,298 B2 | 3/2012 | Bordry |
| 2002/0143443 A1 | 10/2002 | Betters et al. |
| 2006/0229851 A1 | 10/2006 | Cannon |
| 2007/0033277 A1 | 2/2007 | Yukawa |
| 2007/0115938 A1 | 5/2007 | Conzachi et al. |
| 2010/0017167 A1 | 1/2010 | Duc et al. |
| 2010/0023201 A1 | 1/2010 | Kinney |
| 2010/0042445 A1 | 2/2010 | Nicosia |
| 2011/0153540 A1 | 6/2011 | Beg et al. |
| 2011/0276832 A1 | 11/2011 | Schneider et al. |
| 2012/0078463 A1 * | 3/2012 | Gros ...................... G07C 5/008 701/31.4 |
| 2012/0101793 A1 | 4/2012 | Cheriere et al. |
| 2012/0271587 A1 * | 10/2012 | Shibuya ............. G05B 23/0229 702/127 |
| 2013/0132001 A1 * | 5/2013 | Yacout .................... G01D 3/10 702/35 |
| 2015/0088363 A1 | 3/2015 | Besseau et al. |

OTHER PUBLICATIONS

Non-Final Office Action for U.S. Appl. No. 14/491,622 dated May 12, 2016.
French Search Report for Application No. 1357572 dated Mar. 27, 2014.
French Search Report for Application No. 1359066 dated Jul. 24, 2014.
Non-Final Office Action for U.S. Appl. No. 14/491,622 dated Mar. 9, 2017.
Interview Summary for U.S. Appl. No. 14/491,622 dated Jul. 18, 2016.
Final Office Action for U.S. Appl. No. 14/491,622 dated Oct. 27, 2016.
Advisory Action for U.S. Appl. No. 14/491,622 dated Jan. 19, 2017.

* cited by examiner

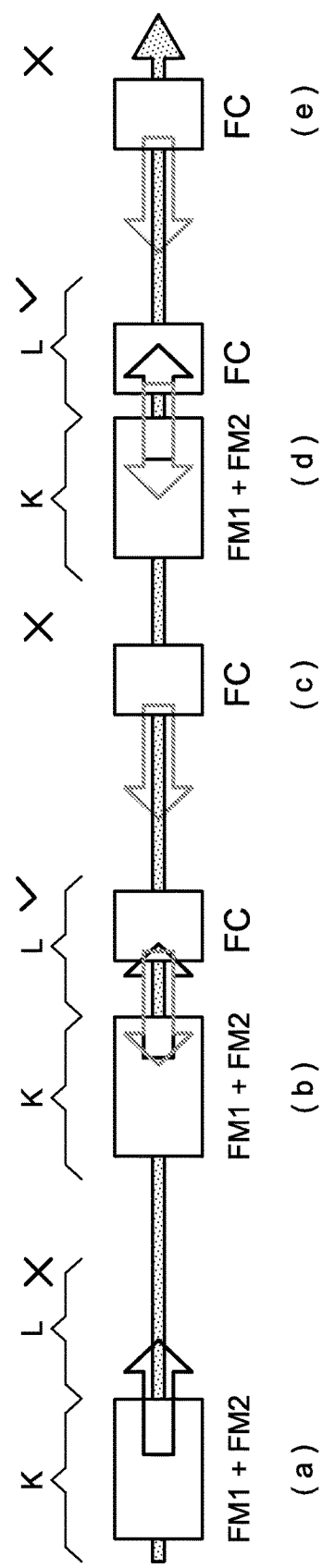

METHOD AND COMPUTER PROGRAM FOR THE MAINTENANCE AID OF AIRCRAFT EQUIPMENT

TECHNICAL FIELD

The subject matter disclosed herein relates to evaluation of operating risks for the maintenance decision aid of aircraft equipment.

BACKGROUND

Aircraft maintenance mainly consists of curative actions aiming at replacing or repairing failing equipments of the aircraft or equipments currently being degraded, by planned inspections, generally periodic, and by preventive actions such as the replacement of equipment having a finite lifetime. The curative actions rely particularly on the knowledge of the airplane state which is in particular obtained by the aircrew reports, the onboard diagnostic systems and the inspections made during the planned checks.

Commonly, the maintenance activity is organised into "line maintenance" and "hangar maintenance". The hangar maintenance is performed during pre-programmed checks. Such maintenance operations are often made at the main operating base of the airline operating the aircraft. The line maintenance is performed between two flights, at the place where the aircraft is. The main object of the line maintenance is the urgent curative actions whereas the hangar maintenance enables planned tasks as well as deferred curative actions to be performed.

However, these maintenance policies are not always optimal. In particular, by deferring these curative actions to the successive check, the line maintenance increases the risk that a further degradation causes a flight departure delay or cancellation or other disturbances.

SUMMARY

One purpose of the subject matter disclosed herein is to minimise this risk by providing the operators in charge of maintenance with a decision aid tool providing them a prognostic of a failure critical to the good working order of the aircraft.

Thus, one object of the subject matter disclosed herein is to provide a decision aid method for maintenance operations of aircraft equipment, the aircraft comprising a maintenance system arranged to perform a record of equipment failure messages and equipment failure warning messages emitted during a flight, the method comprising for example extracting at least one combination of failure messages corresponding to failure messages recorded by the maintenance system during a flight and a set of previous flights, and determining, as a function of the at least one extracted combination, a probability of occurrence of at least one warning message possibly accompanied by one or more failure messages.

Some preferred but non-limiting aspects of the method are the following ones.

In a first embodiment, warning messages are represented as nodes of a directed graph comprising a set of arcs each provided with a transition probability from one warning message to another, each warning message of the graph corresponding to a given sequence of failure messages, and the at least one extracted combination corresponds to the sequence formed by the failure messages recorded during the flight and the set of previous flights, the extracted sequence is represented as a mix of warning messages, the determining a probability of occurrence comprises calculating a probability of occurrence of each of the warning messages of the graph made by a random walk on the graph initialised by the representation of the extracted sequence.

In a second embodiment, extracting at least one combination of failure messages comprises identifying, from the failure messages recorded by the maintenance system during a flight and the set of previous flights, at least one combination of failure messages recognised to be likely to generate a given warning message, and the determining a probability of occurrence comprises determining a success rate for the prediction of the given warning message from the identified combination.

This second embodiment can operate a prior learning step comprising an operation consisting in recognising at least one combination of failure messages likely to generate a warning message and calculating an accuracy of the recognised combination to generate the warning message, the success rate for the prediction of the warning message from an identified combination initially corresponding to the accuracy.

According to a second aspect, the subject matter disclosed herein relates to a computer program product comprising code instructions for running steps of the method according to the first or second embodiment when the program is run on a computer.

BRIEF DESCRIPTION OF THE DRAWINGS

Other aspects, purposes, advantages and characteristics of the subject matter disclosed herein will better appear upon reading the following detailed description of preferred embodiments thereof, given by way of non-limiting example, and made in reference to the appended FIG. 1 which is a schematic illustration of the recognition of combinations of failure messages for the prediction of warning messages in accordance with a second embodiment of the subject matter disclosed herein.

DETAILED DESCRIPTION

The aim of maintenance aid is to provide maintenance operators with useful information to breakdown diagnostic. This aid can be made as follows.

Each aircraft system includes a tool known as BITE ("Built in Test Equipment") which is used for detecting and isolating faulty equipment.

Further, critical systems of the aircraft are monitored by a flight warning system (FWS) which accounts for the failures of these systems to the aircrew.

Data emitted by the BITE tools (equipment failure messages) and the FWS system (equipment failure warning messages) are recorded and processed by a centralised maintenance system (CMS).

The diagnostic result performed by the CMS system is transferred to the maintenance operators through a printer and a MCDU (Multipurpose Control and Display Unit). This result can also be transferred to a ground station via the ACARS (Aircraft Communication and Reporting System) or via an ATSU (Air Traffic Service Unit). This result is further recorded in a database onboard the aircraft.

An equipment failure message is more precisely a message emitted by a system of the aircraft to the CMS maintenance system to inform that it has failed in achieving its function or that it has identified that another system has failed in achieving its function.

An equipment failure warning system is as for it a message emitted for the FWS system of the aircrew to indicate that an event which could have an impact, or which has directly an impact, on the operation of the aircraft, has been detected. Such a warning message can be triggered following one or more failure messages or depending on conditions unique thereto.

The impact level of a warning message is indicated in a document known as MEL ("Minimum Equipment List") which lists critical elements which have to be available to ensure the aircraft operation safely. The impact level can be:

GO: the warning message has no impact on the aircraft operation, but the corresponding failure has to be corrected in a given time interval;

GO IF: the warning message has an impact on the aircraft operation, and may cause an aircraft grounding if certain conditions are met;

NO GO: the warning message has an impact on the aircraft operation, and causes an aircraft grounding.

A post flight report (PFR) is a list containing all the failure messages and all the warning messages emitted during a flight and recorded by the maintenance system. This PFR report is generated and transmitted at the end of the flight. A current flight report (CFR) is made up during the flight and contains all the failure messages and all the warning messages emitted, and recorded by the maintenance system, from the flight beginning to the time when the report is generated.

Within this scope, the subject matter disclosed herein aims at providing a maintenance decision aid tool which relies on an analysis of failure messages recorded during previous flights to predict the emission of a warning message during subsequent flights. It will be noted that if the description herein below specifically relates to the prediction of a warning message, the subject matter disclosed herein is not restricted thereto and also extends to the prediction of a breakdown, the breakdown being characterised by the occurrence of a warning message and one or more failure messages associated therewith.

According to a first aspect, the subject matter disclosed herein thus relates to a decision aid method for maintenance operations of aircraft equipment, the aircraft comprising a maintenance system arranged to make a record of equipment failure messages and equipment failure warning messages emitted during a flight, the method comprising:

extracting by computer processing (also referred to as a computer processor) at least one combination of failure messages corresponding to failure messages recorded by the maintenance system during a flight and a set of previous flights;

determining by the computer processing, as a function of the at least one extracted combination, a probability of occurrence of at least one warning message possibly accompanied by one or more failure messages.

The probabilities of occurrence, or part of them, for example the most important, can be presented to the operators in charge of maintenance by a man-machine interface; they are for example displayed on a screen.

In a possible embodiment, the extracting and determining steps are made at the end of a flight, and for this, operate the content of PFR reports recorded at the end of the flight and a set of previous flights. In another embodiment, these steps are made during a flight, and for this, operate the content of the CFR report of the flight and the content of PFR reports recorded at the end of a set of previous flights.

The extracting step can be preceded by a step of filtering the failure messages recorded by the maintenance system during the flight and the set of previous flights. This filtering is more particularly performed by the computer processing so as to take into account the first occurrences of a failure message from the records and to ignore the following occurrences when the failure message is continuously generated.

In particular, an occurrence rate of a failure message can be calculated and compared to the average and standard deviation of the occurrence rates of the different failure messages generated by the same aircraft or by a set of aircrafts having the same configuration of equipment. Thus, a failure message can be considered as recurrent when most aircrafts generate this message (high average occurrence rate) or even when the standard deviation is low in comparison to the average. And an aircraft can be considered as continuously generating a failure message when the occurrence rate of this message for this aircraft is higher than the average and standard deviation (for a distribution only taking into account the aircrafts generating this message).

First Embodiment: Graph

In a first embodiment of the subject matter disclosed herein, warning messages are represented as nodes of a directed graph comprising a set of arcs each provided with a transition probability from one warning message to another, each warning message of the graph corresponding to a given sequence of failure messages. The graph is typically stored in a database.

On the basis of this graph, and considering a set of failure messages emitted in the past, the subject matter disclosed herein provides the prediction of the most probable warning messages in the future, by associating a classification to this predicted messages. This approach relies on the same principles as those used for web pages classification systems suggested by the Internet search engines, such as the algorithm PageRank™, by considering an analogy between a warning message and a Web page.

Each warning message is thus indexed by a given sequence of failure messages (equivalent to keywords) and a way to connect the warning messages in the graph consists in considering a predecessor-successor relationship on the base of their occurrence in a data history. Thus, the transition probability $p_{kj}$ of each graph arc (arc connecting a warning message $W_j$ to a warning message $W_k$) can thus be written as:

$$p_{kj} = p(W_k / W_j) = \frac{a_{jk}}{\sum_{aji'}},$$

where $a_{jk}$ represents the number of predecessor j-successor k relationships registered in the history.

A sequence of failure messages which is extracted from the PFR reports of the previous flights can then be considered as being equivalent to a search enquiry. From this enquiry, the subject matter disclosed herein enables all the warning messages to be classified and those which have the greatest probability of occurrence during next flights to be suggested.

The graph can be made up by making use of the documents of manufacturers, for example the Trouble Shooting Manual (TSM) or the Minimum Equipment Lists (MEL), to associate, with warning messages, a weight corresponding to each of the failure messages. By way of illustrating example, the use of these documents enables the warning message $W_1$ to match the failure messages $M_1$ and $M_5$ as $W_1=\frac{1}{2}M_1+\frac{1}{2}M_5$.

The graph can also be made up by making a statistical analysis on a set of failure messages and warning messages registered in a history. For example, a warning message of the graph corresponds to a given sequence of warning messages recorded before the occurrence of the warning message since the occurrence of the previous warning message.

By way of illustrating example, the following successive post-flight reports PFR are considered.

| PFR0 | | PFR1 | | | PFR2 | | PFR3 | |
|---|---|---|---|---|---|---|---|---|
| M2 | M5 | W1 | M4 | M3 | M4 | M1 | W2 | M1 | M5 |

In this example, each failure message preceding a warning message $W_i$ up to the preceding warning message $W_j$ is taken into account to describe the warning messages $W_i$. The weight of each failure message can for example be calculated according to the TF-IDF ("Term Frequency-Inverse Document Frequency") weighting method. The use of this history thus enables the warning message $W_2$ to match the failure messages $M_1$, $M_3$ and $M_4$ as $W_2=\frac{1}{4}M_1+\frac{1}{4}M_3+\frac{1}{2}M_4$.

Within the scope of this first embodiment, extracting at least one combination of failure messages corresponding to failure messages recorded by the maintenance system during a flight and a set of preceding flights more precisely consists in extracting the sequence formed by the set of failure messages recorded during the flight and the set of preceding flights up to the last recorded warning message. By way of the example, the sequence extracted includes all the failure messages, possibly after filtering as previously set out, recorded in the PFR report of the flight and in the PFR reports of K previous flights (the sequence is built from the failure messages $M_i$ by going back up to the last warning message $W_{j-1}$ recorded which is excluded from the sequence, wherein a sequence may include messages of K flights, K is not necessarily constant, K enabling the size of a sequence to be restricted). This sequence is referred to as S, which can therefore be represented as weighted failure messages: $S=(f_iM_i)_i$ where $M_i$ designates a failure message. By way of purely illustrating purposes, there is for example $S=M_1+M_5$.

It has been previously shown that each warning message $W_j$ of the graph corresponds to a given sequence of failure messages. Each warning message of the graph can thus be determined as a vector of weighted failure messages: $W_j=(p_{ji}M_i)_i$.

And generally, the warning messages of the graph can thus be represented as a matrix $$W = \begin{bmatrix} w_0 \\ w_1 \\ \ldots \\ w_N \end{bmatrix} = P \cdot M,$$

where P is a transition matrix made up of transition probabilities $p_{ij}$ and M is a matrix representing the different failure messages $M_i$.

And in the same way, the extracted sequence S of failure messages can be represented as a mix of warning messages as $S=P^{-1}\cdot W$, where $P^{-1}$ designates the inverse matrix of the transition matrix.

By way of purely illustrating example, considering two warning messages W1, W2 and five failure messages M1-M5 such that $W_1=\frac{1}{2}M_1+\frac{1}{2}M_5$ and $W_2=\frac{1}{4}M_1+\frac{1}{4}M_3+\frac{1}{2}M_4$. The extracted sequence $S=M_1+M_5$ can then be represented in the following form of a mix of warning messages $S=\frac{1}{2}W_1+\frac{1}{4}W_2$.

Still within the scope of this first embodiment, determining a probability of occurrence comprises calculating, by the computer processing (or processor), a probability of occurrence of each of the warning messages of the graph made by a random walk on the graph initialised by the representation of the extracted sequence. For this, $V_{n+1}=P^T V_n$ is calculated up to the convergence, with $v_0$ corresponding to the extracted sequence S represented as a mix of warning messages, and P the transition matrix made up of transition probabilities from one node to another of the graph.

In one alternative, the random walk on the graph is a teleportation walk characterised by a probability $\alpha$ of following a graph arc provided with a transition probability and a probability $(1-\alpha)$ of skipping evenly randomly to a node of the graph. The teleportation is for avoiding giving too high a probability of occurrence to failure messages which are actually nodes having little or no transition to other nodes of the graph. For this, $V_{n+1}=\alpha P^T V_n+(1-\alpha)V_n$ is calculated up to the convergence, with $v_0$ corresponding to the extracted sequence S represented as a mix of warning messages, and P the transition matrix made up of transition probabilities from one node to the other of the graph.

The method according to the first embodiment can further comprise a step of classifying the warning messages of the graph taking into consideration a degree of similarity between the probabilities of occurrence Pred(A/C) determined by the random walk of each of the warning messages of the graph and an aircraft operating profile Prof(A/C) characterising its sensitivity to generating some warning messages under some operating conditions (kind of mission: short, medium or long range; climatic conditions; aircraft characteristics, etc.), the profile consisting of a set of weights each associated with a warning message. This similarity degree is for example calculated using the cosine similarity method as $$\frac{Pred(A/C) \cdot Prof(A/C)}{\|Pred(A/C)\| \cdot \|Prof(A/C)\|}$$

Some warning messages can actually be not directly related to a specific configuration of aircraft equipment. For example, some messages can be due to the oldness of the aircraft, the way the airline carries out the maintenance thereof, etc. The characterisation of an aircraft operating profile then allows to take into account the fact that these messages are relatively recurrent. Therefore, by calculating a similarity degree between probabilities of occurrence of the warning messages and relative weights to the recurrence of the warning messages for the aircraft, the classification of warning messages suggested by the subject matter disclosed herein allows a refined prediction of the warning messages (a warning message, the probability of occurrence of which is calculated as a function of the failure messages recorded in the past, having its prediction all the more confirmed that its recurrence for the aircraft is actually high).

The aircraft operating profile can thus comprise an aircraft profile. By way of example, the aircraft profile can comprise a risk vector $R_w(A/C)$ representing the propensity of the aircraft to generate warning messages. This risk vector can be calculated by counting all the different warning messages recorded in PFR reports of the aircraft. After normalising, a risk vector is calculated which associates a weight $r_i$ with each warning message $W_i$: $R_w(A/c) = \{W_i, r_i\}_i$.

The aircraft profile can also comprise a similarity vector $SIM_{A/C}$ with aircrafts of the same type. This vector can be calculated by counting the number of identical PFR reports (for example via a distance between PFR reports corresponding to a number of distinct messages). After normalising, $SIM_{A/C} = \{A/C_i, sim_i\}_i$, where $A/C_i$ represents an aircraft of the same type and $sim_i$ the weight associated with the similarity degree. It will be noted that this vector is not directly used as the other information of the profile, but enables the profile information of a similar aircraft to be selected to refine the classification of the prediction, in particular in the case where the history or the aircraft information are not enough to allow a good classification of the predictions: then, results that have been generated by "similar" aircrafts are taken into account as a function of their weight.

The aircraft profile can also comprise a profile unique to the airline operating the aircraft, for example by pooling the aircraft data of this airline to calculate a similarity vector with the aircrafts of the same airline and by operating it in the same way as the similarity vector $SIM_{A/C}$ described above. And the aircraft profile can also comprise a profile unique to the environmental aircraft operating conditions, for example by pooling the aircraft data having the same kind of mission under the same climatic conditions to calculate a similarity vector with these aircrafts and by operating it in the same way as the similarity vector $SIM_{A/C}$ described above.

Second Embodiment: Recognition of Known Combinations

In a second embodiment of the subject matter disclosed herein, extracting by the computer processing at least one combination of failure messages comprises identifying, from the failure messages recorded by the maintenance system during the flight and the set of previous flights, at least one combination of failure messages recognised to be likely to generate a given warning message, and the determining by the computer processing of a probability of occurrence comprises determining a success rate of the prediction of the given warning message from the identified combination.

This second embodiment can in particular rely on a prior learning step comprising an operation consisting in recognising at least one combination of failure messages likely to generate a warning message and calculating an accuracy of the recognised combination to generate the warning message. The recognised combinations of failure messages and their accuracies are typically recorded in a database.

Considering a message history, and for a given breakdown B (characterised by a given warning message possibly accompanied by one or more failure messages), series of consecutive flights of a same aircraft are considered, wherein the series should not comprise any occurrence of the breakdown B, except for the L latest flights of the series. The series can be considered on different time horizons as a function of the number of flights considered; they comprise at least R+L flights and at most K+L flights.

In a series, and without taking the L latest flights into account, all the possible combinations of failure messages occurring at least once are extracted and a score of each of the combinations is calculated/updated in the following way.

If during the L latest flights of the series, the given warning message is recorded, a HIT counter is incremented, which counts the number of times the combination is identified in a series ending with a record of the warning message.

If on the contrary during the L latest flights of the series, the given warning message is not recorded, a MISS counter is incremented, which counts the number of times the combination is identified in a series not ending with a record of the warning message.

The accuracy of the combination to generate a breakdown B can then be expressed as HIT/(HIT+MISS). A coverage rate corresponding to the proportion of occurrences of the breakdown B which can be successfully predicted by the recognition of the combination can also be calculated.

Taking the scheme of FIG. 1 by way of purely illustrating example, a combination consisting of the failure messages FM1 and FM2 (observed on a horizon made up of K consecutive flights) likely to lead to a warning message FC is considered. The following is chronologically observed. (a) The combination FM1+FM2 is recognised, but the warning message FC is not observed between the L following flights. (b) Then the combination FM1+FM2 is recognised and the warning message FC is observed between the L following flights. (c) Then, the warning message FC is observed, without probable recognition of the combination. (d) Then follows a recognition of the combination FM1+FM2 and the occurrence of the warning message FC during the L following flights. (e) Finally, the warning message FC is observed, without probable recognition of the combination. From the above, it is inferred that two warning messages out of four have been predicted by the recognition of the combination. The coverage rate is thus equal to 50%. Besides, out of the three predictions inferred from the recognition of the combination, two warning messages have actually been recorded. An accuracy of the combination equal to 66% is inferred therefrom.

In a possible embodiment of the learning step, in order to ensure a statistically sufficient representativity, a minimal number of flight series ending with a record of the warning message is required.

In a possible embodiment of the learning step, the recognised combination can be filtered as a function of its accuracy and its coverage rate. Thus, only the combinations having a sufficiently high accuracy and/or coverage rate can be retained.

The extracting and determining steps of this second embodiment can be implemented in the following way.

During a flight or at the end of a flight, for each modelled warning message (meaning that it has been identified during the learning step, and that it is known that one or more combinations of failure messages are likely to lead to it) not appearing in the CFR or PFR report, a series of messages is created comprising the messages recorded in the CFR or PFR report of the flight and in the PFR messages of a set of previous flights (K−1 previous flights, or less if the modelled warning message has appeared in the K−1 previous flights).

Then, in this message series, the combination(s) of failure messages recognised to be likely to generate this given warning message is or are identified, the combinations and their accuracies being recorded in the database. Then, for each recognised combination identified, the occurrence of the warning message is predicted with an associated success rate. The success rate initially corresponds to the accuracy HIT/(HIT+MISS) calculated during the learning phase. This success rate can be updated following each occurrence or lack of occurrence of the warning message predicted, as indicated hereinbelow.

The occurrence of the warning message is more precisely predicted on a set of L following flights. Therefore, a number of flights during which the prediction is active is defined.

If a warning message the prediction of which is active is identified in the CFR or PFR report of the flight, then the prediction success is recorded by incrementing the counter HIT, thus updating the success rate.

If a warning message the prediction of which is active is not identified in the CFR or PFR report of the flight, the number of flights during which the prediction is still active is reduced. If the prediction is then no longer active, the failure of the prediction is recorded by incrementing the counter MISS, thus updating the success rate.

In a further aspect or embodiment, the occurrence of a warning message is recorded when a maintenance operation has been performed since the prediction, the operation having led to the lack of occurrence of the predicted warning message. This enables the success rate of the prediction not to be degraded.

In a possible embodiment, among the failure messages recorded by the maintenance system during the flight and the set of previous flights, a portion of a combination of failure messages known to be likely to generate a given warning message is identified. The occurrence of the warning message associated with this known combination is then predicted, by assigning a weight to the success rate of the prediction of the given warning message from the identified combination. The weight depends for example on the size of the portion identified.

In one embodiment, to counteract the low occurrence rate of some breakdowns, similar breakdowns (for example identical breakdowns signalled by different redundant systems) can be gathered and these gathered breakdowns can be worked on as original breakdowns. The gathering can also be performed at failure messages being precursors of the breakdown.

The subject matter disclosed herein is not restricted to the method such as previously described but is also applicable to a computer program product comprising code instructions for running steps of this method, both in its first and its second embodiment, when the program is run on a computer.

The subject matter disclosed herein can be implemented in software in combination with hardware and/or firmware. For example, the subject matter described herein can be implemented in software executed by a processor. In one exemplary implementation, the subject matter described herein can be implemented using a computer readable medium having stored thereon computer executable instructions that when executed by a processor of a computer control the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

The invention claimed is:

1. A decision aid method for maintenance operation of aircraft equipment, the aircraft comprising a maintenance system arranged to make a record of one or more equipment failure messages and equipment failure warning messages emitted during a flight, the method comprising:
   extracting, by at least one processor, at least one combination of failure messages corresponding to failure messages recorded by the maintenance system during a flight and a set of previous flights; and
   determining, by the at least one processor, as a function of the at least one extracted combination, a probability of occurrence of at least one warning message, wherein:
   warning messages are represented as nodes of a directed graph stored in computer memory comprising a set of arcs each provided with a transition probability from one warning message to another, each warning message of the directed graph corresponding to a given sequence of failure messages;
   the at least one extracted combination corresponds to the sequence formed by the failure messages recorded during the flight and the set of previous flights;
   the extracted sequence is represented as a mix of warning messages; and
   the determining a probability of occurrence comprises calculating, by the at least one processor, a probability of occurrence of each of the warning messages of the graph made by a random walk on the graph initialized by the representation of the extracted sequence.

2. The method according to claim 1, wherein the random walk on the graph is a teleportation walk characterised by a probability a of following the probabilistic transition arcs of the graph and a probability (1−α) of skipping evenly randomly to a node of the graph.

3. The method according to claim 1, wherein a warning message of the graph corresponds to a given sequence of failure messages recorded before the occurrence of the warning message since the occurrence of a previous warning message.

4. The method according to claim 1, comprising classifying warning messages of the graph taking into consideration an aircraft operating profile related to the warning messages.

5. A computer program product comprising code instructions for running steps of the method according to claim 1, when the program is run on a computer.

* * * * *